(12) United States Patent
Landfeldt et al.

(10) Patent No.: US 7,200,679 B2
(45) Date of Patent: Apr. 3, 2007

(54) CREATING DISTRIBUTED PROXY CONFIGURATIONS

(75) Inventors: Bjorn Landfeldt, Stockholm (SE); Aruna Seneviratne, New South Wales (AU); Per Gunningberg, Uppsala (SE); Sebastien Ardon, Sydney (AU); Marius Portmann, Brisbane (AU); Yuri Ismailov, Spanga (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 832 days.

(21) Appl. No.: 10/068,779

(22) Filed: Feb. 5, 2002

(65) Prior Publication Data

US 2002/0165928 A1 Nov. 7, 2002

Related U.S. Application Data

(60) Provisional application No. 60/283,735, filed on Apr. 13, 2001.

(51) Int. Cl.
*G06F 15/16* (2006.01)

(52) U.S. Cl. ............... 709/246; 709/219; 709/231

(58) Field of Classification Search ........ 709/217–219, 709/231, 246, 247
See application file for complete search history.

(56) References Cited

U.S. PATENT DOCUMENTS

| | | | |
|---|---|---|---|
| 5,673,322 A | | 9/1997 | Pepe et al. |
| 5,996,022 A | * | 11/1999 | Krueger et al. ............ 709/247 |
| 6,061,728 A | | 5/2000 | Mead et al. |
| 6,112,228 A | * | 8/2000 | Earl et al. ................... 709/219 |

(Continued)

FOREIGN PATENT DOCUMENTS

EP  0 981 232  2/2000

(Continued)

OTHER PUBLICATIONS

Wu, Sun, and Liao, Chang-Chain, "Virtual Proxy Servers for WWW and Intelligent Agents on the Internet," Proceedings of the Thirtieth Hawaii International Conference on System Sciences, IEEE, Jan. 7-10, 1997, vol. 4, pp. 200-209.*

(Continued)

*Primary Examiner*—Bunjob Jaroenchonwanit
*Assistant Examiner*—Victor Lesniewski (57) ABSTRACT

Server-to-user delivery of a data stream associated with a service provided by the server is effectuated by selecting the server and, automatically and without manual intervention, providing in a communication path that is to be used for the delivery a proxy that performs a proxy operation on the data stream during the delivery. A proxy can be automatically installed in a communication path through a data network. In response to an installation request, a communication port for coupling to the communication path is automatically allocated and a proxy to support data flow through the communication port is automatically loaded. The proxy is operable for performing a proxy operation on the data stream. In maintaining proxies in a communication path used to deliver from a server to a user a data stream associated with a service provided by the server, it can be determined when a first proxy in the communication path is not performing its proxy function within the communication path. In response to such a determination, a replacement proxy can be provided in the communication path automatically and without manual intervention. The replacement proxy replaces the first proxy in the communication path to perform the proxy function of the first proxy.

28 Claims, 5 Drawing Sheets

U.S. PATENT DOCUMENTS

| | | | |
|---|---|---|---|
| 6,128,644 | A | 10/2000 | Nozaki |
| 6,167,438 | A | 12/2000 | Yates et al. |
| 6,212,560 | B1 | 4/2001 | Fairchild |
| 6,243,761 | B1* | 6/2001 | Mogul et al. ............... 709/246 |
| 6,247,050 | B1* | 6/2001 | Tso et al. ................... 709/246 |
| 6,253,326 | B1 | 6/2001 | Lincke et al. |
| 6,266,701 | B1* | 7/2001 | Sridhar et al. .............. 709/246 |
| 6,345,303 | B1* | 2/2002 | Knauerhase et al. ........ 709/238 |
| 6,377,991 | B1* | 4/2002 | Smith et al. ................ 709/219 |
| 6,377,993 | B1* | 4/2002 | Brandt et al. ............... 709/227 |
| 6,389,462 | B1* | 5/2002 | Cohen et al. ............... 709/219 |
| 6,421,674 | B1* | 7/2002 | Yoakum et al. ............... 707/10 |
| 6,438,576 | B1* | 8/2002 | Huang et al. ............... 709/202 |
| 6,604,143 | B1* | 8/2003 | Nagar et al. ................ 709/229 |
| 6,633,923 | B1* | 10/2003 | Kukura et al. .............. 709/203 |
| 6,704,798 | B1* | 3/2004 | Mogul ........................ 709/246 |
| 6,785,705 | B1* | 8/2004 | Kocherlakota ............. 709/238 |
| 6,826,626 | B1* | 11/2004 | McManus ................... 709/246 |
| 2002/0133600 | A1* | 9/2002 | Williams et al. ............ 709/228 |

FOREIGN PATENT DOCUMENTS

| | | |
|---|---|---|
| EP | 1035708 | 9/2000 |
| WO | 98/43177 | 10/1998 |
| WO | 00/19682 | 4/2000 |
| WO | 01/22195 | 3/2001 |

OTHER PUBLICATIONS

Mao, Zhuoqing Morley; So, Hoi-Sheung Wilson; and Kang, Byunghoon, "Network Support for Mobile Multimedia Using a Self-adaptive Proxy," Proceedings of the 11$^{th}$ International Workshop on Network and Operating Systems Support for Digital Audio and Video, ACM Press, Jan. 2001, pp. 107-116.*

S. Chandra et al.: "Multimedia Web Services for Mobile Clients Using Quality a Ware Transcoding", The Second ACM International Workshop on Wireless Mobile Multimedia, Aug. 20, 1999.

A. Fox, et al.: "Adapting to Network and Client Variability Via on-Demand Dynamic Distillation", Proc. Seventh Intl. Conference on Arch. Support for Prog. Lang. And Oper. Sys. (ASPLOS VII), Oct. 1996.

Mohan et al., "Content Adaption Framework: Bringing the Internet to Information Appliances", Global Telecommunications Conference—Globecomm 1999.

"Accessing Distributed Proxy Configurations", U.S. Appl. No. 10/068,770, filed on Feb. 5, 2002.

Fuenfrocken, S., "Integrating Java-based Mobile Agents into Web Servers under Security Concerns", System Sciences, 1998, Proceedings of the Thirty-First Hawaii International Conference on Kohala Coast, HI, USA Jan. 6-9, 1998, Los Alamitos, CA, USA, IEEE Comput. Soc., US, Jan. 6, 1998, XP010262766, ISBN: 0-8186-8255-8.

Gribble, S. D., et al., "The Ninja Architecture for Robust Internet-Scale Systems and Services", Computer Networks, Elsevier Science Publishers B.V., Amsterdam, NL, vol. 35, No. 4, Mar. 2001, XP004304860, ISSN: 1389-1286.

* cited by examiner

CREATING DISTRIBUTED PROXY CONFIGURATIONS

This application claims the priority under 35 USC 119(e)(1) of copending U.S. provisional application No. 60/283,735 filed on Apr. 13, 2001 and incorporated herein by reference.

FIELD OF THE INVENTION

The invention relates generally to delivery of data network services and, more particularly, to the use of proxies in the delivery of such services.

BACKGROUND OF THE INVENTION

The services on today's Internet are designed with PCs and fixed access in mind. Therefore, they might not work well with wireless access and devices. For example, many web pages contain many graphical objects that significantly increase the size of the downloaded data. This in turn requires a certain data rate in the access network in order for the download time not to be too large. In order to alleviate the problem it is common to place a proxy in-between the terminal device and the content. The proxy can for example cache information locally or transcode images to a smaller data size in order to decrease the download time.

In terms of web enhancing proxies it is very common to use local caching proxies such as squid [http://www.squid-cache.org] within the network to decrease network load and download times since pre-cached web pages only have to be downloaded from the cache and not from the content server. There are other web enhancing proxies such as WebOnAir [http://eed.ericsson.se]. This proxy is used to compress data and distil images to shorten the download time over slow access links. Still other proxies are used to enhance the performance of networked applications over specific link types (IETF PEP-pile WG] Others change content to fit terminal equipment characteristics. An example of this is the WAP gateway that transforms HTML (Hypertext mark-up Language) documents to WML (Wireless Mark-up Language).

There are further many specialized proxies used for single web sites such as bank web sites. These proxies are located at the client side and provide end-to-end security.

Conventionally, proxies are manually configured and statically placed. There are a number of problems with this approach. The manual configuration is inflexible in that it limits the granularity of the services offered. It is difficult to define in advance a large number of discrete service levels that take into account the diversity of the operational environment. Moreover, this coarse grain service provision can result in degraded performance. For example, transcoding of some images may result in larger image files.

Traditionally, proxies are designed to provide a single service for a large number of users and are not designed to provide multi-functional services such as a combination of compression and encryption. Because of this monofunctional design paradigm, the present invention recognizes that no standard mechanisms exist for permitting proxies to interoperate. Therefore it is not possible to use multiple proxy services developed by different vendors.

Furthermore, the user must have some knowledge of how to set up the proxy parameters. As the user must make a decision upon the service level parameters, he/she needs to have specific knowledge of the semantics of these parameters.

Also the user must reconfigure networked applications whenever changing the access network. Most proxy systems require the user to enter the proxy parameters into each networked application. When changing the point of attachment, the applications have to be reconfigured to reflect the location of local proxy services. In addition, the user needs to have knowledge of the proxy location information such as IP address and port number. Since proxies are statically placed and manually configured, the service depends on the access to the proxies. When a host on which a proxy runs breaks down, or when a dependent link fails, the whole service is disrupted. This affects all sessions, and they must then be reinitiated. The present invention recognizes that there is no automatic way to avoid the failing host or link, since the existing solutions use known addresses that are propagated to the user, who then needs to find a new proxy manually.

Additionally, conventional static proxies are provided by a third party, so the user needs to trust that these proxies do not corrupt or disclose data.

It is therefore desirable to provide for proxy service configuration while avoiding the aforementioned disadvantages.

SUMMARY

According to the invention, network-based (or network-accessible) servers can be utilized to automatically and dynamically place and configure proxy services, thereby advantageously avoiding and/or alleviating the aforementioned problems associated with conventional proxy service configuration techniques. A network-based server controls the automatic placement and configuration of proxy services based on knowledge of available network resources and information about the user. The invention advantageously permits automatic recovery from a proxy failure by automatically replacing the failed proxy. The invention further provides for modification of service requests so that presently-configured proxy services can be accessed.

DETAILED DESCRIPTION

Figure 1:
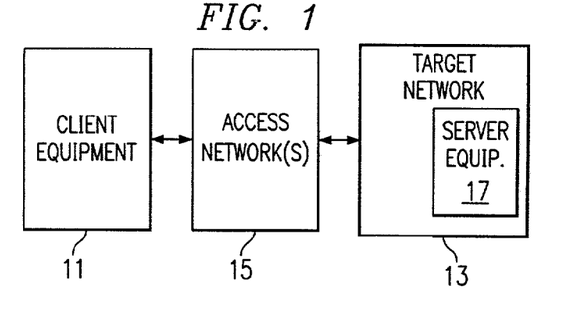
FIG. 1 diagrammatically illustrates exemplary embodiments of a communication system according to the invention.

FIG. 1 diagrammatically illustrates exemplary embodiments of a communication system according to the invention. In FIG. 1, client equipment 11, for example a cellular telephone, a personal digital assistant (PDA), a laptop computer or a desktop computer, is coupled to a target network 13, for example the Internet, via one or more access networks 15. Examples of the access networks at 15 include a LAN, a wireless LAN, and a packet radio network. After obtaining access to the target network 13, the client equipment 11 can access server equipment 17 in the target network 13. The server equipment 17 can then provide a desired service to the client equipment 11 via the target network 13 and a selected access network at 15.

Figure 2:
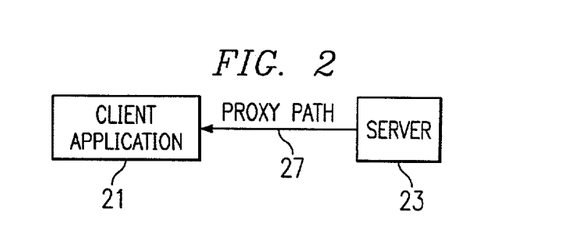
FIG. 2 diagrammatically illustrates communication between the server equipment and client equipment of FIG. 1.

FIG. 2 diagrammatically illustrates communication according to the invention between a client application 21 running on the client equipment 11 and a server 23 running on the server equipment 17. As shown in FIG. 2, the server 23 communicates information to the client application 21 via a proxy path 27. The proxy path 27 is a communication path that includes at least one network-based proxy (for example any of the proxies described above) which has been automatically (and in some embodiments dynamically) placed and configured according to the invention. The proxies in the proxy path 27 can, for example, provide the type of proxy services described above.

Figure 3:
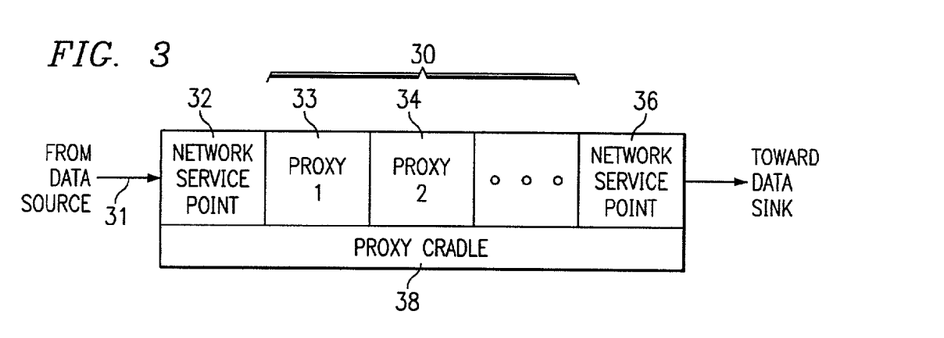
FIG. 3 diagrammatically illustrates pertinent portions of exemplary embodiments of the proxy path of FIG. 2.

FIG. 3 diagrammatically illustrates pertinent portions of exemplary embodiments of the proxy path of FIG. 2. The proxy path of FIG. 3 includes a plurality of proxies concatenated together to form a proxy chain 30. The input 31 of FIG. 3 is coupled to the input of a first proxy 33 via an input network service point 32. The input network service point 32 makes the input of the first proxy 33 available, for example, to an output network service point associated with another proxy chain, or to an output of the client 21 or server 23. The output of the first proxy 33 is coupled to the input of a second proxy 34, whose output is coupled to, for example a third proxy (not explicitly shown), and so on. The output of the last proxy in the proxy chain 30 is coupled to an output network service point 36, which output network service point permits the output of the last proxy to access, for example, an input network service point associated with another proxy chain, or an input of the client 21 or server 23 (see also FIG. 2).

The concatenated proxies of FIG. 3 can be designed such that they do not require direct communication to either the client 21 or the server 23 (see also FIG. 2). For example, the proxies can be designed as general-purpose proxy service modules with input and output capability. Because such proxy service modules are designed only to read input data, process the input data and then output the processed data to a general-purpose stream, each proxy service module will be unaware of any neighboring proxy service modules. A proxy cradle 38 coupled to the proxy chain 30 and network service points 32 and 36 includes logic for handling proxy-to-proxy communications within the proxy chain 30, for example keeping track of originating and destination addresses. The proxy cradle 38 also manages the network service points 32 and 36. These network service points are provided transparently to the proxy service modules. The proxy cradle 38 and the network service points 32 and 36 are collectively referred to herein as a Proxy Execution Environment (PEE). In some exemplary embodiments, the proxy execution environment of FIG. 3 is provided by a suitable server operating in the target network 13 of FIG. 1. Although the proxy execution environment of FIG. 3 supports a plurality of concatenated proxies (a proxy chain), a given proxy execution environment can, in some embodiments, support only a single proxy.

Figure 4:
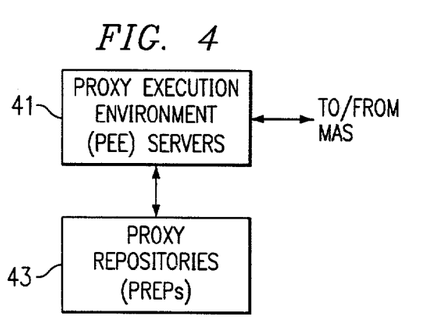
FIG. 4 diagrammatically illustrates exemplary embodiments of proxy execution environment servers and proxy repositories according to the invention.

FIG. 4 diagrammatically illustrates proxy execution environment servers 41 which can download selected proxy modules from proxy repositories (PREPs) 43. A given proxy execution environment server provides the network service points and proxy cradle of FIG. 3, and arranges the downloaded proxy service modules into a proxy chain such as illustrated in FIG. 3. Both the proxy execution environment servers at 41 and the proxy repositories at 43 can be provided, in some embodiments, as conventional web servers.

Figure 4A:
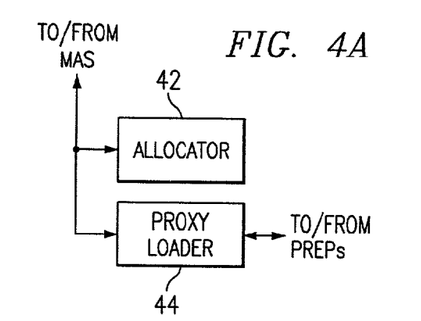
FIG. 4A illustrates pertinent portions of an exemplary proxy execution environment server embodiment according to the invention.

FIG. 4A illustrates pertinent portions of an exemplary PEE server embodiment, namely a network service point allocator 42 coupled for communication with the MAS, and a proxy loader 44 coupled for communication with the MAS and one or more PREPs. The functions of the allocator 42 and proxy loader 44 are described in more detail hereinbelow.

When the server 23 of FIG. 2 connects to, for example, an Internet Service Provider (ISP), it can provide the ISP with a list of proxies that it will want to use to customize its clients' sessions. If the proxies are acceptable to the ISP, then the ISP can place those proxies in one or more PREPs within its network. Of course, proxy modules can be installed in PREPs by any party, for example, clients, access network providers and third party service providers.

In some embodiments, PEE servers and PREP servers can be co-located with either the client 21 or the server 23. In other embodiments, PEEs and PREPs can be deployed outside of the target network 13 and client equipment 11. For example, in banking applications, PEEs and PREPs can be deployed in bank branches, and the bank branches can provide access to them. A program running on each proxy execution environment server 41 can operate under control of a Mobile Aware Server (MAS), illustrated in FIG. 4, to execute the installation, configuration and removal of proxies and proxy claims with respect to a given proxy path.

Figure 5:
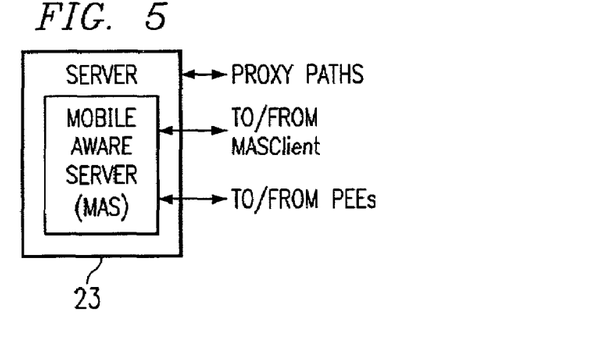
FIG. 5 diagrammatically illustrates exemplary embodiments of a Mobile Aware Server according to the invention.

The Mobile Aware Server MAS is diagrammatically illustrated in FIG. 5. In some embodiments, the MAS runs as a front end software module on the server 23 of FIG. 2, as shown in FIG. 5. The MAS provides functionality that makes the server 23 mobile aware. The MAS communicates with an entity designated as MASClient in FIG. 5. The MAS also communicates with the PEE servers 41 of FIG. 4. Based on information received from the MASClient (described in detail hereinbelow) and information that the MAS knows about the server (for example the nature and content of the service), the MAS can conduct dialogues with selected PEE servers in parallel to instantiate a desired configuration of proxy service modules within the proxy paths.

Figure 6:
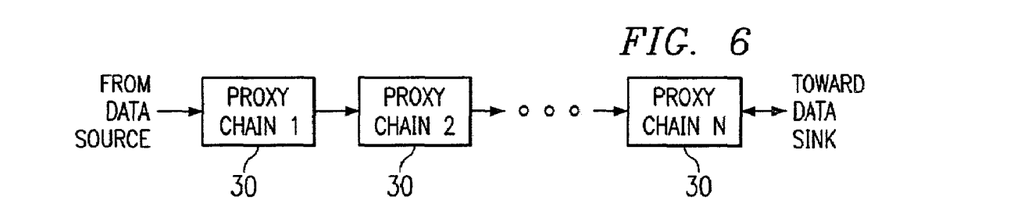
FIG. 6 diagrammatically illustrates pertinent portions of further exemplary embodiments of the proxy path of FIG. 2.

FIG. 6 diagrammatically illustrates pertinent portions of further exemplary embodiments of the proxy path 27 of FIG. 2. In the embodiments of FIG. 6, the proxy path includes a plurality of concatenated proxy chains 30 (see also FIG. 3). Each of the proxy chains of FIG. 6 includes an associated input network service point 32 as shown in FIG. 3 and an associated output network service point 36 as shown in FIG. 3, although such network service points are not explicitly shown in FIG. 6. The input and output network service points permit the proxy chains to be concatenated as shown in FIG. 6.

By appropriately communicating with the PEE server(s) 41, the MAS of FIG. 5 can automatically and dynamically place and configure a proxy path to include any desired proxy, proxy chain (see FIG. 3) or concatenation of proxy chains (see FIG. 6). Note, for example, that a proxy path having four proxies therein can be realized in several ways, such as a single proxy chain of four concatenated proxies, or as four concatenated single-proxy "chains" provided by four different PEE servers, or as a first proxy chain of two concatenated proxies (provided by one PEE server) concatenated with a second proxy chain of two concatenated proxies (provided by another PEE server).

Figure 7:
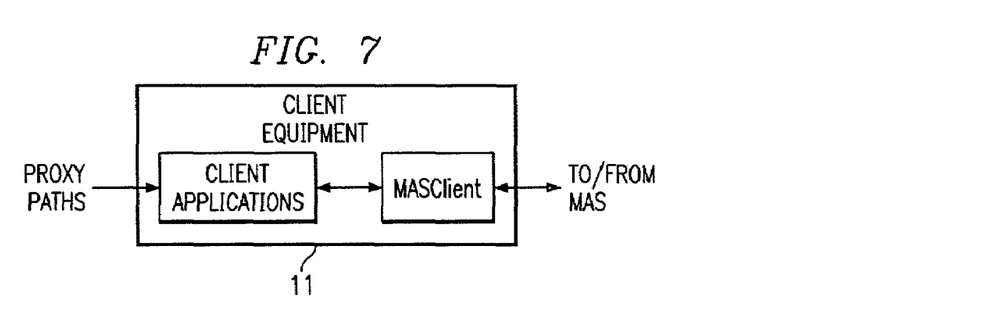
FIG. 7 diagrammatically illustrates an exemplary embodiment of the client equipment of FIG. 1 according to the invention.

FIG. 7 diagrammatically illustrates an exemplary embodiment of the client equipment 11 of FIG. 1. The client equipment of FIG. 7 includes a plurality of client applications such as shown at 21 in FIG. 2, and also includes the MASClient entity discussed above with respect to FIG. 5. In some embodiments, the MASClient entity is provided near the client equipment 11 but is not integrated therewith. In some embodiments, the MASClient entity is a software signaling module which is responsible for communicating to the MAS of FIG. 5 information associated with the client equipment 11, for example user preferences, capabilities of the client equipment 11 (for example hardware capacity) and capabilities of the available access networks 15 of FIG. 1. The MAS of FIG. 5 uses the information received from the MASClient to manage the installation and configuration of the proxy path 27 (see also FIG. 2). Because the MAS is provided on the server side, it will typically have a wider view of factors such as the overall communication system state, connection requests and application requirements. It is therefore advantageous to make the MAS on the server side the active entity in configuring the proxy paths, because it is in a good position to optimize and manage the service enhancements provided by the proxy path 27.

Figure 8:
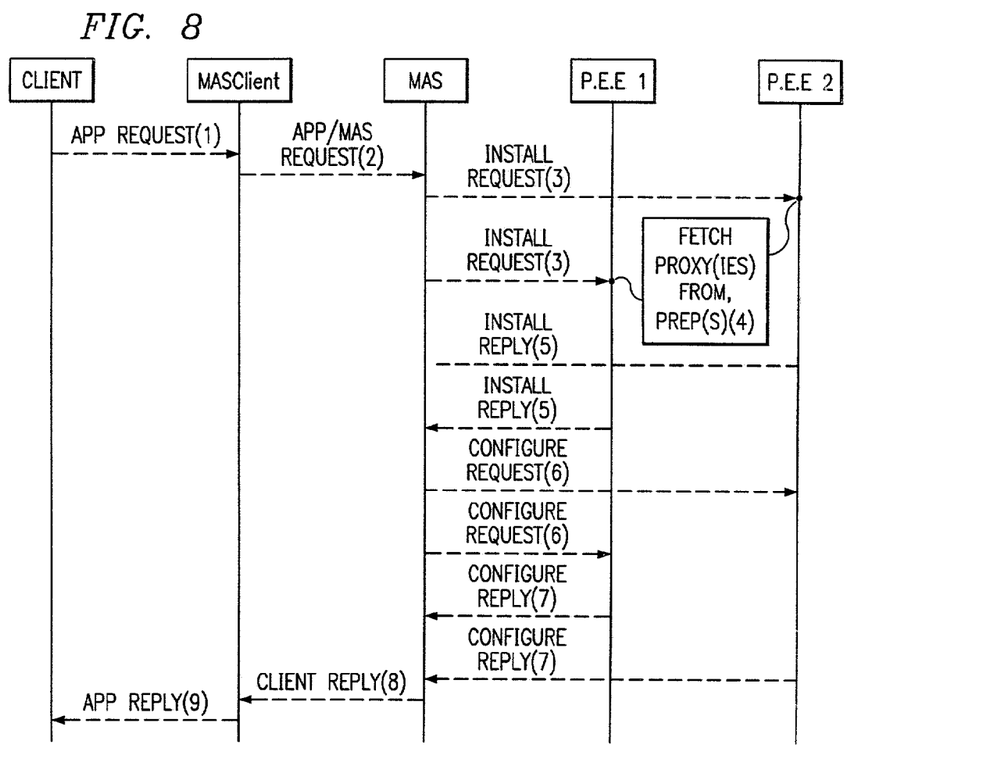
FIG. 8 diagrammatically illustrates exemplary proxy configuration signaling which can be conducted according to the invention.

The MASClient, MAS, PEEs and PREPs are cooperable to implement a proxy provider apparatus that provides one or more proxies in a communication path automatically and without manual intervention. FIG. 8 diagrammatically illustrates exemplary signaling conducted between the client, the MASClient, the MAS, PEE servers (two of which are shown in FIG. 8 and designated as PEE 1 and PEE 2) and PREPs. Initially, the MASClient intercepts a request (1) sent from the client application to the server 23 (see also FIG. 2). The MASClient forwards (2) this request to the MAS, together with the aforementioned user preference information, client equipment information and access network information. Based on the information received from the MASClient, the MAS determines which proxies should be installed, which PREPs the proxies should be downloaded from, how the downloaded proxies should be ordered in the proxy path, and at which PEE servers the downloaded proxies should be installed. After the MAS has made these determinations, the MAS begins parallel dialogues with the selected PEE servers.

First, the MAS sends parallel installation requests (3) which respectively tell each of the selected PEEs which proxies to install and from which PREPs to download the proxies. In some embodiments, the PEE or client selects the PREPs. The selected PEE servers can in turn perform the following operations in parallel: download (see also the proxy loader 44 of FIG. 4A) the selected proxies from the selected PREPs (4); instantiate the downloaded proxies; and allocate the necessary network service points (see FIG. 3), for example TCP and/or UDP sockets. The network service points, defined (for example) by an IP address and a port number, uniquely identify where the associated proxy chain is listening for connections and/or receiving data.

In order to instantiate the proxy path, the network service points for each proxy or proxy chain are communicated to any other proxy(ies) or proxy chain(s) in the proxy path. The port numbers for server sockets are dynamically allocated by the PEE servers (see also the allocator 42 in FIG. 4A), and therefore cannot be known beforehand by the MAS. Thus, this information is sent back from the selected PEEs in respective parallel installation replies (5). In a second stage of the parallel dialogues between the MAS and the PEEs, the MAS, having collected from the PEEs the information about their associated network service points, sends respective parallel configuration requests (6) to the PEE servers. These configuration requests can, for example, identify for each PEE server the input network service point of its downstream neighbor PEE server in the desired proxy path configuration. Each PEE server (two of which are shown in FIG. 8) can then connect to its downstream neighbor PEE server in response to the configuration request, thereby completing the configuration of the desired proxy path. The PEE servers send to the MAS parallel configuration replies (7) indicating that they have connected to their respective downstream neighbor PEEs. The MAS responds to the configuration replies (7) by sending back a client reply message (8) to the MASClient. If the proxy path was created successfully, the client reply message also specifies where to connect to the first proxy in the proxy path, for example the input network service point 36 associated with proxy 1 in proxy chain 1 (see FIGS. 3 and 6). The MASClient forwards the information from the client reply (8) to the client in an application reply (9). The server 23 of course knows where to connect to the last proxy of the last proxy chain, by virtue of the MAS, which has received this connection information (i.e., the output network service point information) from the associated PEE server.

If a desired proxy path includes only one proxy chain, this can be achieved by a single installation request (3) to the selected PEE, and the corresponding installation reply (5). The configuration signaling at (6) and (7) is not needed to set up a single proxy chain.

The signaling in FIG. 8 can be accomplished using either in-band or out-of-band signaling. For example, control channels can be permanent, semi-permanent, or opened on a per session basis.

Figure 9:
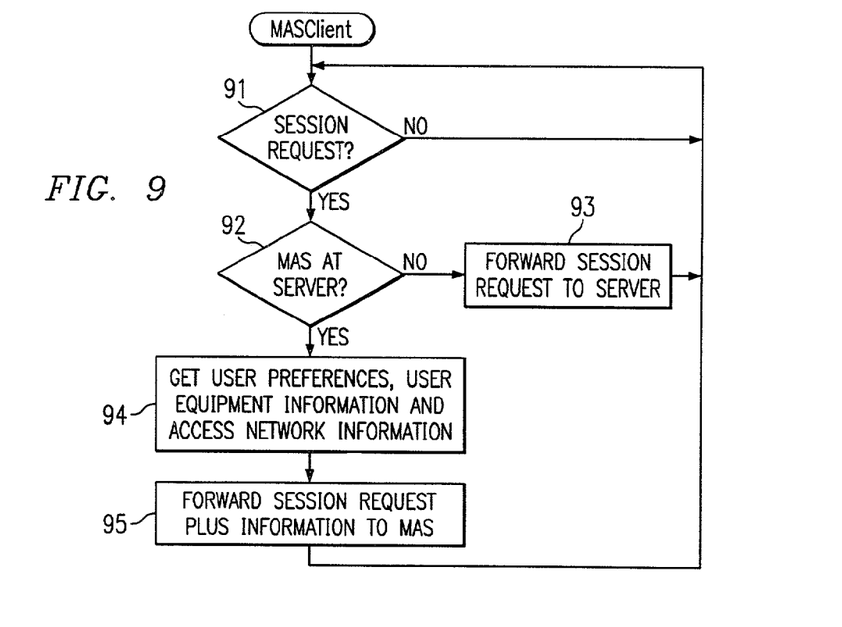
FIG. 9 illustrates exemplary operations which can be performed by the MASClient of FIGS. 5, 7 and 8.

FIG. 9 illustrates some exemplary operations which can be performed by the MASClient of FIGS. 5, 7 and 8. After a session request is received from the client application (or in some embodiments from an ASH as described hereinbelow) at 91, it is determined at 92 whether or not the server 23 includes a MAS. If not, the session request can be forwarded directly to the server at 93. (In some embodiments the MASClient tells the aforementioned ASH to forward an appropriate connection request to the server). If it is determined at 92 that the server does include a MAS, then the user preference information, client equipment information and access network information is obtained at 94. Thereafter, at 95, the session request is forwarded to the MAS together with the information obtained at 94.

In some exemplary situations, a proxy (or proxies) of a given proxy path may need to be installed at one (or both) of the end systems, that is, at the server 23 and/or at the client application 21. In such cases, the MAS can itself install and configure these proxies. The concatenation of all proxies between the server 23 and the client 21 (see FIG. 2) will form the session, and will enhance the services provided by the server to fit the characteristics of the interconnecting networks, the client equipment 11 that is being used, and the requirements of the user.

Figures 10, 11, 12:
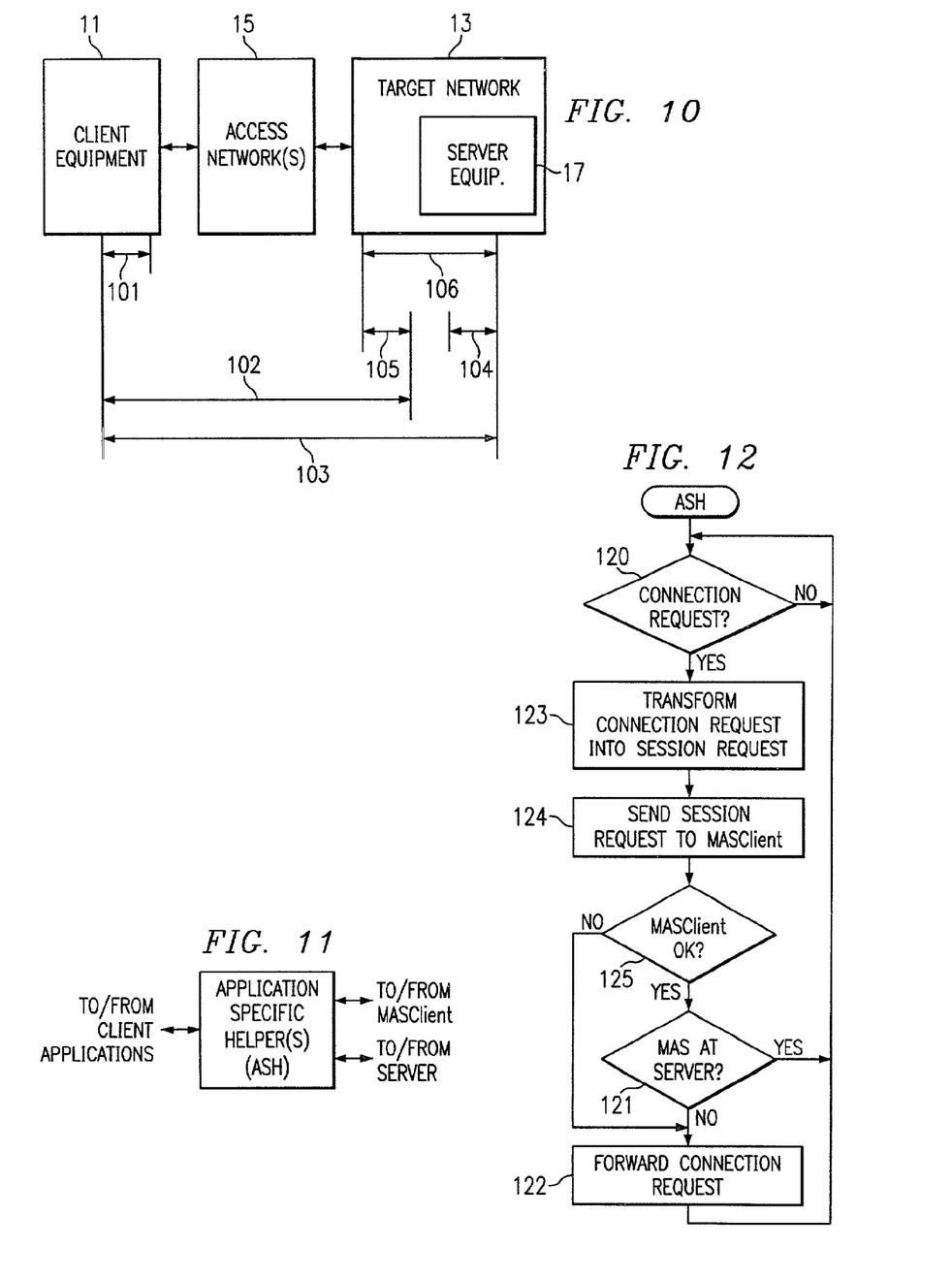
FIG. 10 is generally similar to FIG. 1, and illustrates various exemplary possibilities of where the proxies of the proxy path of FIG. 2 can be located within the communication system of FIG. 1.
FIG. 11 diagrammatically illustrates further exemplary embodiments of the client equipment of FIGS. 1 and 7 according to the invention.
FIG. 12 illustrates exemplary operations which can be performed by the application specific helper of FIG. 11.

FIG. 10 is similar to FIG. 1, and diagrammatically illustrates various exemplary possibilities of where the proxies of the proxy path 27 can be located within the communication system illustrated in FIGS. 1 and 10. Reference numeral 101 shows one or more proxies instantiated only in the client equipment 11. Reference numeral 102 shows proxies instantiated in the client equipment 11 and in the target network 13 outside of the server equipment 17. Reference numeral 103 shows proxies instantiated in the client equipment 11 and the server equipment 17 (and possibly elsewhere in the target network 13). Reference numeral 104 shows one or more proxies instantiated in the server equipment 17 alone. Reference numeral 105 shows one or more proxies instantiated outside of the server equipment 17 in the target network 13. Reference numeral 106 shows proxies instantiated in the server equipment 17 and also in the target network 13 outside of the server equipment 17.

FIG. 11 diagrammatically illustrates further exemplary embodiments of the client equipment 11 of FIGS. 1 and 7. In the embodiments of FIG. 11, the client equipment 11 includes an Application Specific Helper (ASH) which is responsible for helping client applications, for example legacy applications, use the MASClient transparently. Thus, the application specific helper provides a transparent proxy service which adapts requests from the client application to the MASClient entity. The application specific helper therefore acts as an adaptation layer between the client application and the proxy services described herein. The application specific helper of FIG. 11 can be integrated within the client equipment 11 in some embodiments, and can be provided near the client equipment 11 in other embodiments. In some embodiments, each client application has its own respective ASH. For example, each ASH can be preloaded into application address space of its corresponding application.

FIG. 12 illustrates exemplary operations which can be performed by the application specific helper of FIG. 11. A conventional connection request (i.e. a request that is not adapted to the MASClient entity) is awaited at 120. When a connection is received at 120, the connection request is transformed at 123 into a session request suitable for input to the MASClient. At 124, the session request is sent to the MASClient. Thereafter, if it is determined at 125 that the MASClient is operating satisfactorily (for example by receipt of a positive acknowledgment from MASClient), then it is determined at 121 whether there is a MAS at the content server. If not, the current connection request is forwarded to the server at 122, and the next connection request is awaited at 120. If it is determined at 121 that there is a MAS at the content server, then the next connection request is awaited at 120. If it is determined at 125 that the MASClient is not operating satisfactorily, (for example by a negative acknowledgment or no acknowledgment) then the current connection request is forwarded to the content server at 122, after which the next connection request is awaited at 120.

An ASH can also provide service transparency to its application if a MAS-configured session cannot be established. If the ASH can obtain information from the access network (e.g. by using Service Location Protocol, SLP, as described in "Service Location Protocol, Version 2," IETF, RFC 2608, June 1999) about proxy services, it can adapt application requests to a possible proxy specific format and, either using the MASClient or autonomously, connect the application request to the proxy.

Figure 13:
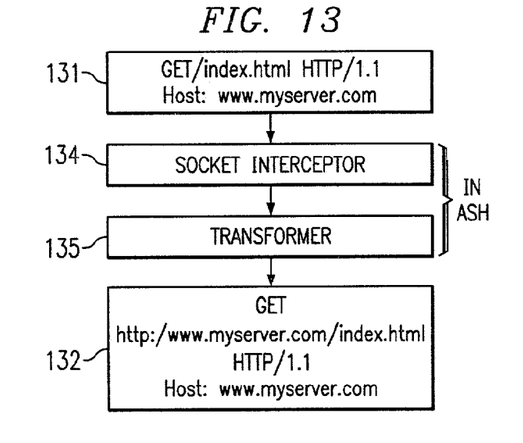
FIG. 13 diagrammatically illustrates pertinent portions of exemplary embodiments of the application specific helper of FIG. 11.

FIG. 13 diagrammatically illustrates pertinent portions of exemplary application specific helper embodiments according to the invention. In particular, FIG. 13 shows an exemplary transformation operation which can be performed by a transformer 135 within the application specific helper of FIG. 11. The example of FIG. 13 highlights the fact that many existing proxies require application requests to be made in a "proxy service-specific" format. FIG. 13 illustrates an HTTP request. If the application specific helper intercepts (using a suitable socket interceptor module 134) an HTTP request from the client application, this request would need to be suitably processed in order to be used together with, for example, a legacy web cache. FIG. 13 illustrates a suitable transformation result 132 which the application specific helper can produce in response to an input HTTP request 131.

In some embodiments, the ASH utilizes the well-known transparency proxy functionality described by A. Cohen, S. Rangarajan, and N. Singh, in "Supporting transparent cacheing with standard proxy caches", Proc. of the 4$^{th}$ International Web Cacheing Workshop, Mar. 1999. Take the case of an http proxy. In some cases, some objects from a webpage pass through the desired proxy (they come from the MAS host) and some other external objects do not pass through the proxy because they don't come from the MAS host. This might not be the desired result. If objects from a particular web page are required to come through the proxy, the ASH transformer 135 can rewrite the urls sent by the browser. For example, the browser would send "GET/images/bjorn.jpg" and the ASH rewrites it to "GET http://mashost/bjorn.jpg".

In another example, the real player might send to the real server something like:
play: /reggaeGreat.ram
client_host: 192.168.0.10
client_port: 6666
proto: UDP The client_host and client_port are the port at which the RealPlayer is ready to receive the data stream. This needs to be changed to the IP address and port number of the first proxy in the path (closest to the server), so that the server sends the UDP stream to the proxy and not the client. So here again application-specific massaging of the application requests is needed, which is what the ASH transformer 135 does. The ASH can obtain the input network service point information (e.g., IP address and port number) for the first proxy in the path (closest to the server) from the application reply (see (9) in FIG. 8) that it forwards to the client application.

Figure 14:
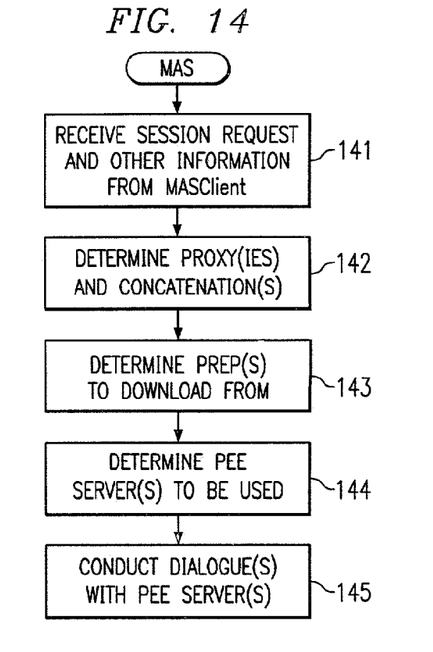
FIG. 14 illustrates exemplary operations which can be performed by the MAS illustrated in FIGS. 5, 7 and 8.

FIG. 14 illustrates exemplary operations which can be performed by the MAS illustrated in FIGS. 5, 7 and 8. At 141, the session request is received from the MASClient, together with the user preference information, the client equipment information and the access network information. At 142, the MAS determines which proxies will be used and how they will be concatenated. At 143, the MAS determines the PREP(s) from which the proxies are to be downloaded. At 144, the MAS determines the PEE server(s) that will be used. The operations at 142–144 can be performed, for example, based on the information received at 141 and based on other MAS knowledge, such as knowledge of the server 23, system conditions, application requirements and connection requests. At 145, the MAS conducts with the selected PEE server(s) the dialogue(s) necessary to configure the desired proxy path(s) between the server and the client.

Figure 15:
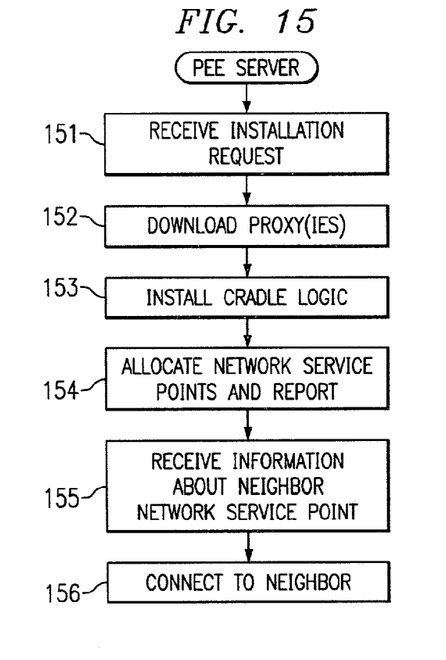
FIG. 15 illustrates exemplary operations which can be performed by the proxy execution environment servers of FIGS. 4, 5 and 8.

FIG. 15 illustrates exemplary operations which can be performed by the PEE servers of FIGS. 4, 5 and 8. After receiving an installation request at 151, the PEE server downloads the proxy(ies) at 152, and installs the proxy cradle logic at 153. At 154, the PEE server allocates the network service points and reports this information to the MAS. The input network service point information about the downstream neighbor PEE is received from the MAS at 155, and the downstream neighbor PEE is connected to at 156.

Figure 16:
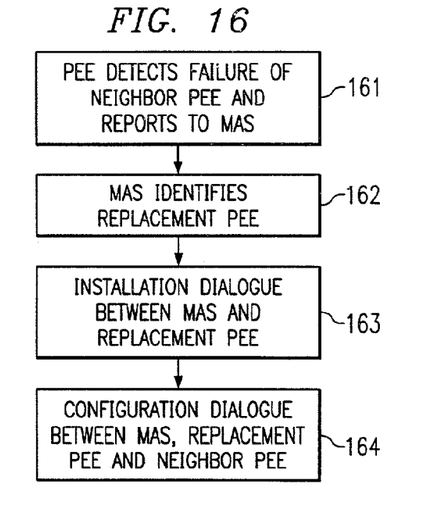
FIG. 16 illustrates exemplary operations which can be performed by exemplary embodiments of the invention to recover from a failure of a proxy execution environment server.

When, for example, a PEE fails and disrupts the session in progress on a proxy path, the closest PEE servers towards the data source and data sink will be in position, by virtue of communications at their output and input network service points, respectively, to detect such failure, and can report it to the MAS. The MAS can then identify a replacement PEE and conduct the requisite installation dialogue therewith (see (3)–(5) of FIG. 8) to establish a replacement proxy (or proxies) at the replacement PEE. Using the configuration dialogue signaling illustrated at (6) in FIG. 8, the input network service point allocated by the replacement PEE can be communicated to the upstream neighbor of the replacement PEE, and the input network service point of the replacement PEE's downstream neighbor can be communicated to the replacement PEE. The replacement PEE and its neighboring PEEs can then connect to one another and confirm their connection to the MAS using the configuration reply signals (7) of FIG. 8. Thus, a new proxy (or proxies) can be dynamically configured into an existing proxy path automatically, without any manual intervention. The exemplary operations described above with respect to failure of a PEE are generally illustrated at 161, 162, 163 and 164 of FIG. 16.

It should also be clear that a replacement PEE can be configured automatically and dynamically for any reason during a session (not just to replace a failed PEE), for example, to change the proxy functionality of a proxy path or to update the proxy path if the client's point of attachment changes during a session.

The present invention as described above provides many advantages, some examples of which are set forth below. Many complex multifunctional proxy services can be created using only a relatively small number of basic proxy modules. Due to parallel signaling between the MAS and the PEEs, a complex proxy configuration including a plurality of concatenated proxy chains can be created with a relatively small signaling delay. Also, installation of an entire proxy chain according to the invention can be advantageously installed by a PEE in response to a single MAS installation request.

If the PEE is co-located with the data source (client or server application) end-to-end security can be achieved without having to statically assign a proxy. By placing proxies in the right order, it is possible to use end-to-end security in combination with other proxy functions such as content adaptation. If PEEs are placed at both the data source and the data sink, proxy services can be provided transparently, i.e. without any modifications of the client or server applications. If the PEE is located at an intermediate host (server equipment) in a specific location within the network, it is possible to use specific characteristics of this location, for example its existence in a trusted environment, which results in improved security. It is also possible to use geographical knowledge of the host location to provide enhanced services. Also, the PEE defines a standardized interface (API) for third parties to develop proxy modules that can interoperate with one another. These modules can be used in stand-alone fashion or can be concatenated with other proxy modules to provide a multi-functional proxy service.

The ASH increases the robustness of the system because the failure of an ASH will only affect the associated application, and will not affect other applications. The ASH further increases system robustness because the failure of the MASClient will not prevent the ASH(es) from functioning transparently. Although the client applications cannot benefit from proxy services, nevertheless they can still communicate with, for example, the content server, because each ASH passes connection requests directly to the server, and because the data streams from the server pass through the respective ASH(es) (the MAS Client performs only signaling functions). The ASH permits applications-independent development of the other proxy service modules. The ASH permits a number of transformations to be performed on the application stream, without the client application or the sever application being aware of these transformations.

The dynamic proxy allocation provided by the invention provides the user with full control to choose desired proxies, for example, proxies which are trusted (e.g. for security and/or operational capability) by the user. This can be accomplished, for example, by specifying the trusted proxy or proxies in the aformentioned user preference information. In contrast, when utilizing static proxies according to the prior art, the user must either accept the proxies that are provided (whether they are trusted or not), or make the choice to operate without the corresponding proxy service.

The dynamic proxy execution environment of the invention permits automatic, dynamic insertion and removal of proxy modules without making manual changes at the end system applications. Also, the invention permits concatenation of proxy modules such that sessions can be customized using multiple proxy modules that are positioned at optimum locations within the network. The invention also advantageously provides for automatic recovery from failures of proxy sites and links.

Although exemplary embodiments of the invention are described above in detail, this does not limit the scope of the invention, which can be practiced in a variety of embodiments.

What is claimed is:

1. A method of supporting delivery, from a server to an application, of a data stream associated with a service provided by the server, the method comprising:
   selecting the server;
   requesting the service provided by the server; and automatically and without manual intervention providing a proxy path between the server and the application for communicating the data stream to the application by sending a request from the server side of the proxy oath to a proxy execution environment (PEE) server, wherein the proxy path comprises a plurality of general purpose proxies retrieved from the PEE server, the plurality of proxies being concatenated together to form a proxy chain with an input of each proxy being connected to an output of each preceding proxy, coupling a proxy cradle to the proxy chain, the proxy cradle comprising logic for managing proxy-to-proxy communications in the proxy path and for managing network service points of the proxy chain, performing a proxy operation on the data stream during the delivery of the data stream to the application, wherein the proxy operation processes the data stream according to characteristics required for communicating with the application, and automatically and dynamically modifying proxy functionality or the proxy path, as required, during a session.

2. The method of claim 1, wherein said proxy path comprises one proxy.

3. The method of claim 1, wherein said step of providing the proxy path includes configuring the proxy chain to provide the requested service.

4. The method of claim 3, further comprising the step of configuring the proxy path based on information indicative of at least one of a preference of the application, a characteristic of equipment that will receive the data stream, and a characteristic of the service.

5. The method of claim 1, further comprising the steps of responsive to the step of sending the request from the server side to the PEE server a request to install the proxy chain in the proxy path, the PEE server installing the proxy chain thereon in response to said installation request, and coupling the proxy execution environment server into the proxy path.

6. The method of claim 5, further comprising the steps of the proxy execution environment server downloading selected proxy modules from proxy repositories and providing an input network service point, an output network service point and coupling with the proxy cradle, all for handling the proxy-to-proxy communication within the proxy chain.

7. The method of claim 6, further comprising the proxy execution environment server allocating the necessary network service points for the associated proxy chain enabling the proxy chain to listen for connections and wherein the service points are TCP sockets or UDP sockets.

8. The method of claim 1, wherein each of the concatenated proxies are designed as general-purpose proxy service modules and do not require direct communication to the server or the application.

9. The method of claim 1, wherein said providing step includes sending from the server side of the proxy path to each of a plurality of proxy execution environment servers a request to install a proxy or concatenated proxy chain from each of the plurality of proxy execution environment servers in the proxy path.

10. The method of claim 9, wherein said step of sending the request to each of the plurality of proxy execution environment servers includes sending the requests in parallel.

11. The method of claim 9, including the proxy execution environment servers installing the respective proxies or proxy chains thereon in response to the respective installation request, and the proxy execution environment servers sending to the server side of the proxy path information that identifies input and output ports to be used for coupling the respective proxy execution environment servers into the proxy path.

12. The method of claim 11, wherein said installing step includes the proxy execution environment servers installing the respective proxies in parallel.

13. The method of claim 12, wherein said step of sending input and output port information includes the proxy execution environment servers sending their respective input and output port information to the server side in parallel.

14. The method of claim 11, wherein said providing step includes forwarding from the server side of the proxy path to the proxy execution environment server the input port information that was sent to the server side by another proxy execution environment server.

15. The method of claim 14, wherein said forwarding step includes, for each of the proxy execution environment servers, forwarding from the server side to the proxy execution environment server the input port information that was sent by the another proxy execution environment server.

16. The method of claim 1, wherein said proxy operation includes one of data compression, data encryption, data transformation, data transcoding and data caching.

17. A system for supporting delivery, from a server to an application, of a data stream associated with a service provided by the server, comprising:

an input for receiving a service request; and a proxy provider apparatus coupled to said input and responsive to the service request for automatically and without manual intervention providing a proxy path between the server and the application for communicating the data stream to the application by sending a request from the server side of the proxy path to a proxy execution environment (PEE) server, wherein the proxy path comprises a plurality of general purpose proxies retrieved from the PEE server, the plurality of proxies being concatenated together to form a proxy chain, wherein a proxy cradle, comprising logic for managing proxy-to-proxy communications in the proxy path and for managing network service points of the proxy chain, is coupled with the proxy chain, with an input of each general-purpose proxy being connected to an output of each preceding proxy, the proxy chain performing a proxy operation on the data stream during the delivery of the data stream to the application, wherein the proxy operation processes the data stream according to characteristics required for communicating with the application, and means for automatically and dynamically modifying proxy functionality or the proxy path, as required, during a session.

18. The system of claim 17, wherein said proxy path comprises one proxy.

19. The system of claim 17, wherein said proxy provider apparatus includes a proxy execution environment server for receiving a request to install a specific proxy in the proxy path and the proxy execution environment server being operable for installing the requested specific proxy.

20. The system of claim 17, wherein said proxy provider apparatus includes a proxy repository for storing proxies therein, said proxy execution environment server coupled to said proxy repository and operable to download the stored proxies therefrom.

21. The system of claim 17, wherein said proxy execution environment server is operable for
    providing an input network service point, an output network service point and coupling with the proxy cradle; all for handling proxy-to-proxy communication within the proxy chain.

22. The system of claim 21, wherein said proxy execution environment server is operable for allocating necessary network service points for the associated proxy chain thereby enabling the proxy chain to listen for connections, wherein the service utilizes TCP sockets or UDP sockets.

23. The system of claim 17, wherein said proxy provider apparatus includes a plurality of proxy execution environment servers for receiving requests to install proxies in the proxy path, each of the plurality of proxy execution environment servers operable for installing respective proxies therefrom in the proxy path, each said proxy execution environment server further operable for sending to the proxy provider apparatus information which identifies input and output ports to be used for coupling the respective proxy execution environment server into the proxy path.

24. The system of claim 17, wherein each of the concatenated proxies do not require direct communication to the server or the application.

25. The system of claim 17, wherein the proxy provider apparatus further comprises means for sending requests for proxies, in parallel, to respective proxy execution environment servers.

26. The system of claim 17, wherein the proxy execution environment server comprises means for installing the respective proxies in the proxy path in response to the respective installation requests and
    the proxy execution environment server sending to the server side of the proxy path information that identifies input and output ports to be used for coupling the respective proxy execution environment servers into the proxy path.

27. The system of claim 26, wherein the proxy execution server includes means for installing the respective proxies in parallel in the proxy path.

28. The system of claim 17, wherein the means for performing a proxy operation includes means for performing data compression, data encryption, data transformation, data transcoding and data caching.

* * * * *

UNITED STATES PATENT AND TRADEMARK OFFICE
CERTIFICATE OF CORRECTION

PATENT NO.         : 7,200,679 B2
APPLICATION NO. : 10/068779
DATED              : April 3, 2007
INVENTOR(S)        : Bjorn Landfeldt et al.

It is certified that error appears in the above-identified patent and that said Letters Patent is hereby corrected as shown below:

Title Page, Item (75), under "Inventors", in Column 1, Line 1, delete "Stockholm (SE)" and insert -- Sydney (AU) --, therefor.

In Column 11, Line 5,. in Claim 1, delete "oath" and insert -- path --, therefor.

In Column 11, Line 37, in Claim 5, after "PEE server" insert -- , the request being --.

Signed and Sealed this

Twenty-fifth Day of March, 2008

JON W. DUDAS
*Director of the United States Patent and Trademark Office*